June 8, 1965   L. G. SIMJIAN   3,187,760
COIN DISPENSING MEANS
Filed Oct. 31, 1962   5 Sheets-Sheet 1
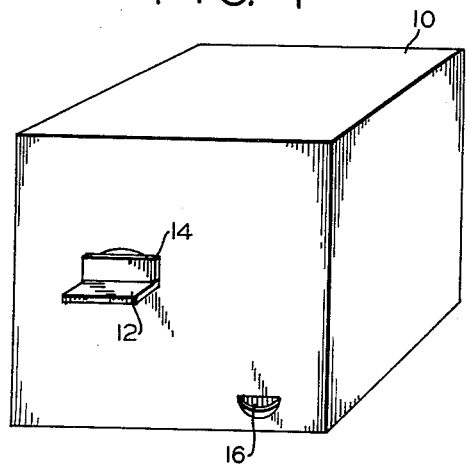
FIG. 1
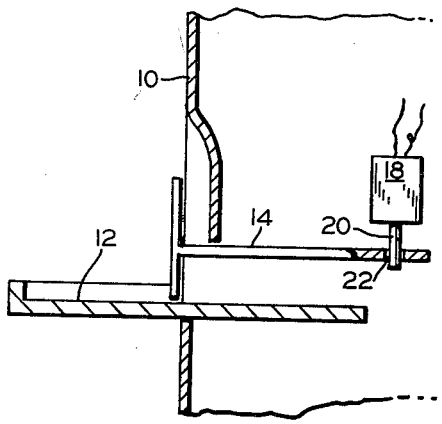
FIG. 2
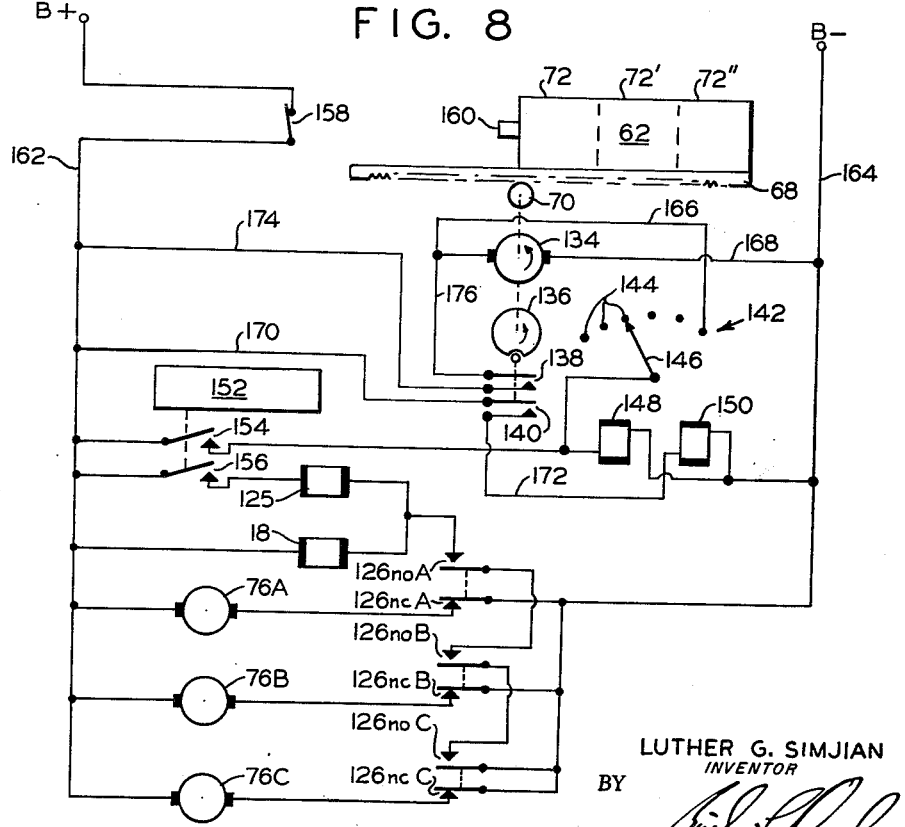
FIG. 8
LUTHER G. SIMJIAN
INVENTOR
BY 
ATTORNEY

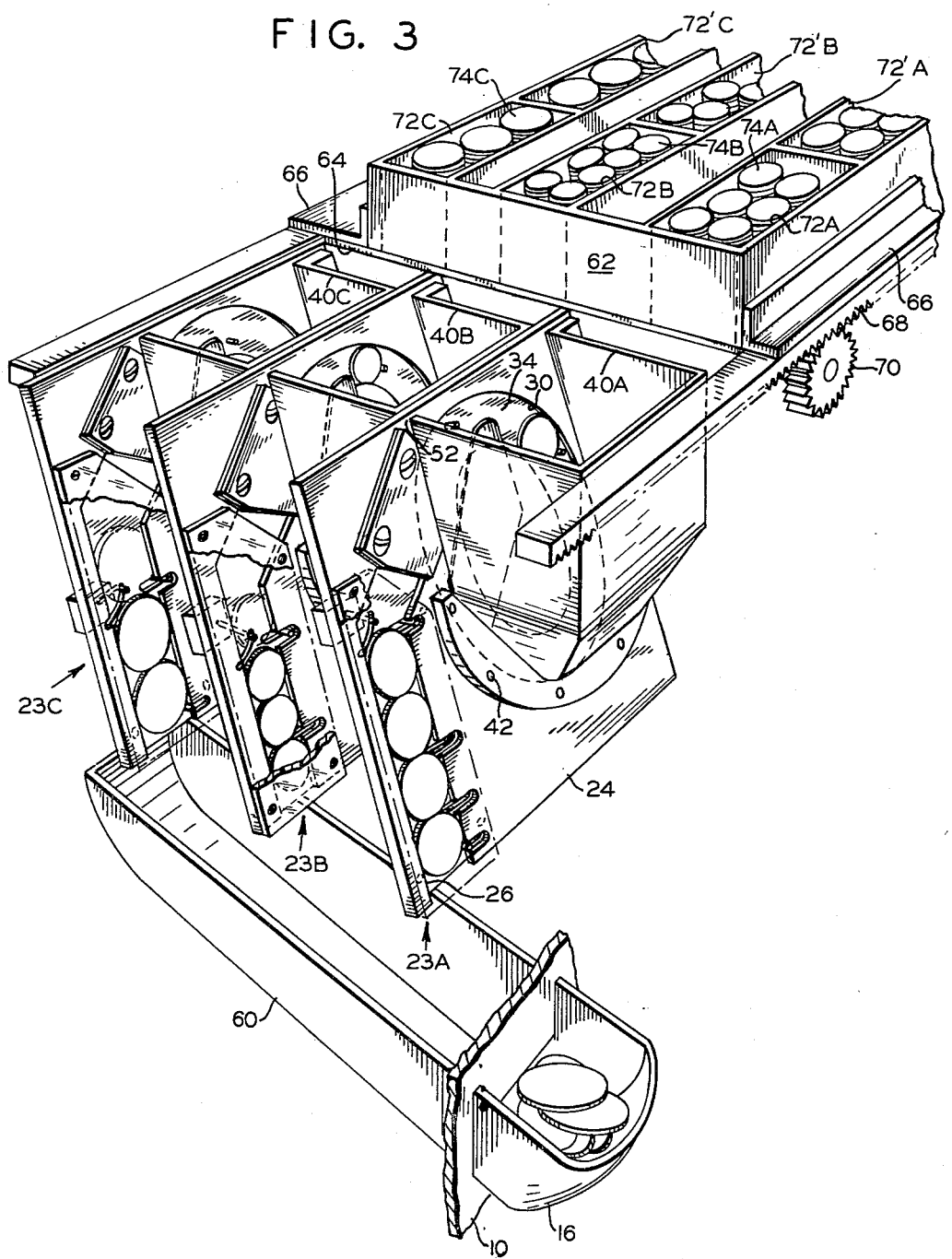

June 8, 1965 L. G. SIMJIAN 3,187,760
COIN DISPENSING MEANS
Filed Oct. 31, 1962 5 Sheets-Sheet 3

LUTHER G. SIMJIAN
INVENTOR
BY
ATTORNEY

June 8, 1965
L. G. SIMJIAN
3,187,760
COIN DISPENSING MEANS
Filed Oct. 31, 1962
5 Sheets-Sheet 4
FIG. 5
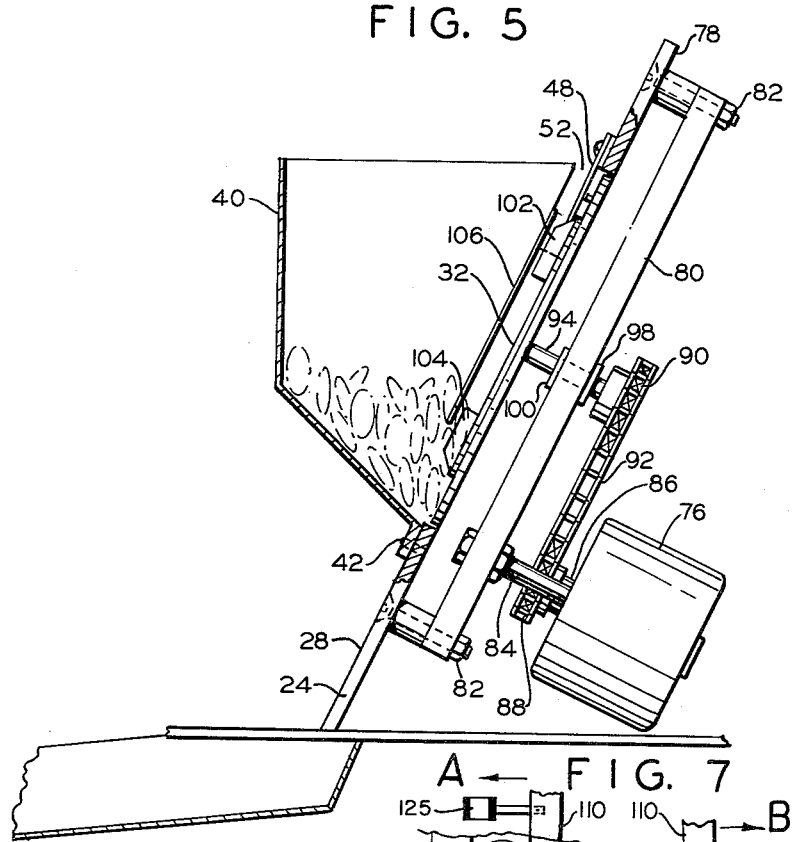
FIG. 7
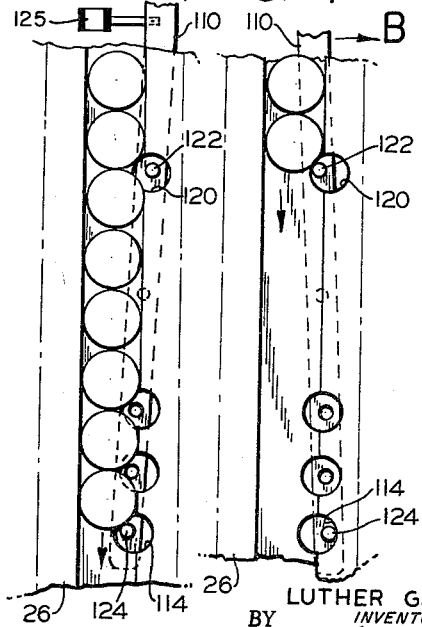
FIG. 6
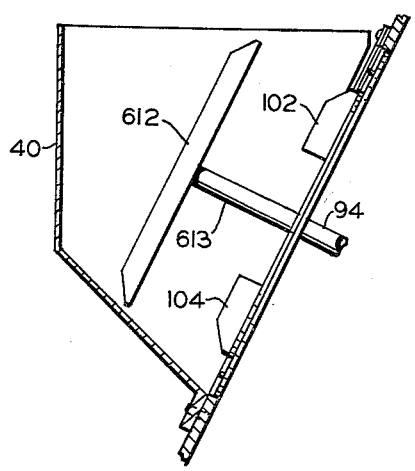
LUTHER G. SIMJIAN
INVENTOR
BY 
ATTORNEY June 8, 1965  L. G. SIMJIAN  3,187,760
COIN DISPENSING MEANS
Filed Oct. 31, 1962  5 Sheets-Sheet 5
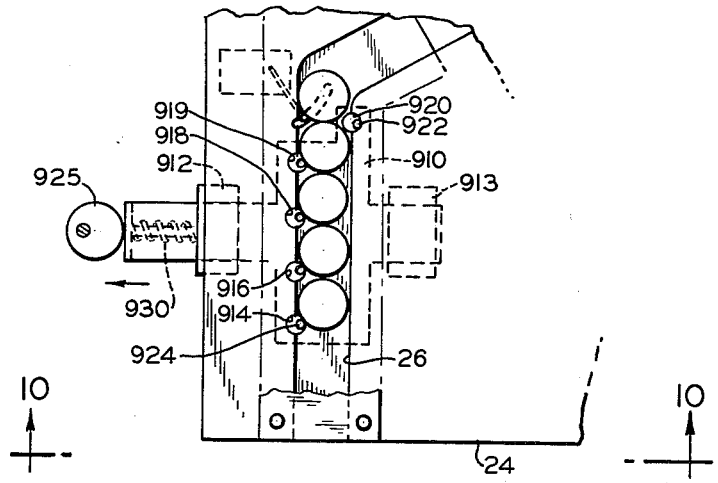
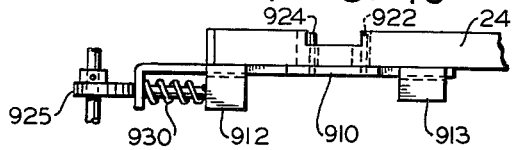
LUTHER G. SIMJIAN
INVENTOR
BY
ATTORNEY

United States Patent Office 3,187,760
Patented June 8, 1965

3,187,760
COIN DISPENSING MEANS
Luther G. Simjian, Greenwich, Conn., assignor to Universal Match Corporation, Ferguson, Mo., a corporation of Delaware
Filed Oct. 31, 1962, Ser. No. 234,369
13 Claims. (Cl. 133—4)

This invention relates to article dispensing means and more particularly to a coin dispensing system.

Coin dispensing systems are customarily included in change making devices. Examples of these are devices for returning to a depositor a plurality of small denomination coins in exchange for a large denomination coin or paper money, and devices for returning to a depositor goods and small denomination coins in exchange for a large denomination coin or paper money.

An object of this invention is the provision of a system for the accurate dispensation of a predetermined number of coins.

Another object is the provision of a system for the accurate dispensation of a predetermined number of coins from a reservoir of coins which are freely scrambled or jumbled together; rather than in an order by array or stacks.

Another object is the provision of a coin dispensing system which is adapted for use in conjunction with money accepting means and which will prevent the acceptance of money when adequate coins are not available for dispensation.

Another object is the provision of a coin dispensing system which can be easily adjusted to dispense different predetermined combinations of number and denomination of coins.

A feature of this invention is an article dispensing system having a reservoir storing a plurality of articles in a scrambled or nonorderly relationship, means for extracting a first predetermined number of these articles from the reservoir; means for dispensing a second predetermined number of the articles from the first number of articles; said second number being equal to or less than said first number; and means for replenishing the reservoir in response to the dispensation of articles.

Other and further objects and features of this invention will be more clearly apparent by reference to the following description when taken in conjunction with the accompanying drawings in which:

FIGURE 1 is a perspective view of the instant coin dispensing device;

FIGURE 2 is a side view, partially in section, of the paper money receiving means of the device of FIGURE 1;

FIGURE 3 is a perspective view of the coin supply, counting and dispensing means of the coin dispensing system;

FIGURE 5 is a rear view, partially in section, of the several means of FIGURE 4 taken along line 5—5;

FIGURE 6 is a rear view, partially in section of an alternative construction of the means of FIGURE 5;

FIGURE 7 is a side view of a detail of the construction of the coin counting chute system of the instant device, FIGURE 7A showing the chute in its counting disposition and FIGURE 7B showing the chute system in its dispensing disposition;

FIGURE 8 is a schematic diagram showing the electrical circuit of the coin dispensing system;

FIGURE 9 is a side view of an alternative construction of the chute system of FIGURE 7; and FIGURE 10 is a top view of the structure of FIGURE 9.

Figure 4:
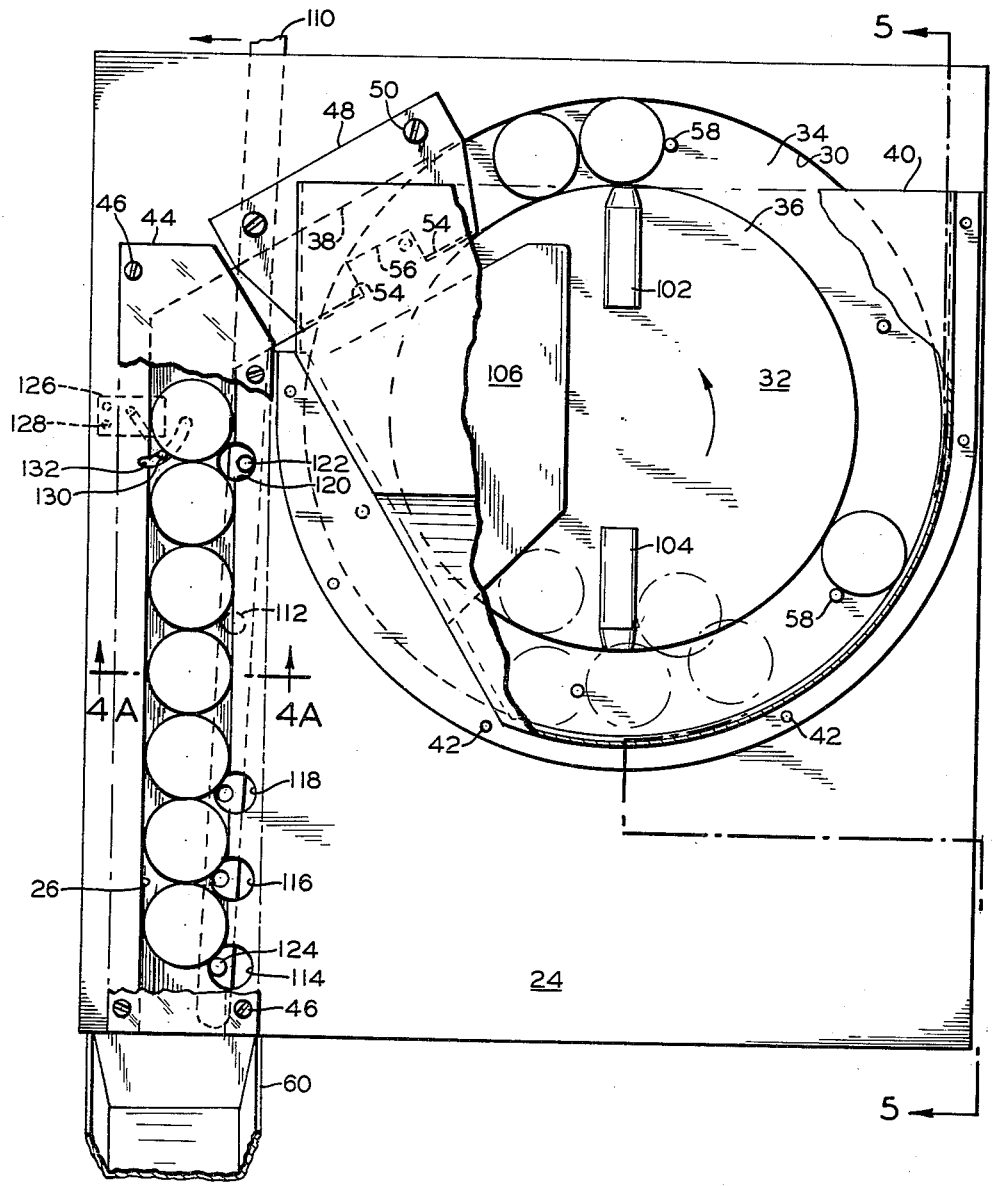
FIGURE 4 is a side view, partially in section, of the several means of FIGURE 3.
Figure 4A:
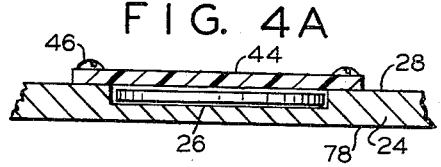
FIGURE 4A is bottom view in section of a detail of FIGURE 4, taken along lines 4A—4A.

Referring now to the drawings and particularly FIGURES 1 and 2, the coin dispensing system of this invention is disposed in a housing 10 having a projecting shelf 12, a pull out tray 14, and a coin cup 16. A depositor may place a money bill on the shelf, pull out the tray, and push the tray into the machine, withdrawing the bill into the machine. The machine may contain apparatus built into the tray for examining the bill for authenticity, and other apparatus for storing accepted bills, such as is disclosed in my copending application Serial No. 210,017, filed July 16, 1962. Alternatively, the tray may receive and withdraw the bill into the machine directly.

Means are provided to normally prevent the machine from accepting money bills. A solenoid 18 has a plunger 20 which normally engages a hole 22 in the tray 14 and prevents the tray from being pulled out. When this interlock solenoid is energized the plunger is disengaged from the tray, releasing it for the examination and acceptance of a money bill.

Also disposed within the housing 10 is a plurality of similar counting devices 23A, 23B, 23C, of which only one will be described in detail hereinafter. As seen in FIGURES 3, 4, 4A, and 5, a baseboard 24 is disposed at an angle to the vertical and has a counting chute 26 recessed into its upper large surface 28. A circular hole 30 is cut through the board and fitted with a circular plate 32 of the same diameter. The circular plate 32 has a recessed annulus 34 in its upper large surface 36. An intermediate chute 38 is also recessed into the baseboard upper large surface 28. One end of the chute 38 is tangental to, and merges with the plate annular recess 34, the other end merges with the top of the counting chute 26. A hopper 40, which encircles the circular plate 32, is open at its top and fixed, as by bolts 42, to the baseboard upper surface 28. A cover 44 is fixed, as by bolts 46, over the counting chute 26 to the upper baseboard surface 28. The cover 44 is made of transparent plastic to permit a visual inspection of the contents of the chute 26. An intermediate cover 48 is fixed, as by bolts 50, to the baseboard surface 28 over the intermediate chute 38 and its junction with the annular recess 34. The cover 48 passes through a gap 52 between the hopper wall and the baseboard surface 28. The lower edge of cover 48 is bent inwardly to provide a lower wall extension 54 of the annular recess 34 and chute 38. A gap 56 is provided in the cover 48 and its lower edge 54 to pass a plurality of pins 58 which are fixed in the annular recess 34. Disposed beneath the counting devices is a catch chute 60, which passes through the front wall of the housing 10 and terminates in the cup 16. Disposed over the counting devices is a bottomless drawer 62 which slides over a fixed bottom plate 64. The front edge of the plate extends slightly over the tops of the hoppers 40. The drawer 62 is fixed, as by a pair of angle brackets 66, to a pair of toothed racks 68. A pair of pinions 70 are meshed respectively with the racks. The drawer 62 may be partitioned into compartments 72A, 72B, 72C along its width. Additional similar compartments may be provided along its length, 72'A; 72'B; 72'C; etc. Coins 74A, 74B, 74C may be disposed in the compartments. A different denomination and quantity of coins may be disposed in each compartment. As the pinions 70 turn, the drawer 62 is advanced towards the hoppers 40, away from the bottom plate 64, progressively dumping, through the bottom of the drawer, a portion of the coins stored in the compartments. The compartments are aligned with the hoppers, so that only the contents of one compartment falls in any one hopper 40.

The system may be arranged to operate as a money changer, that is, in association with a money bill receiving means, to dispense a number of coins equal in value to the money bill received. If the money bill to be received is one dollar, then a convenient coin arrangement will be two quarters, three dimes and four nickles. The counting device 23A may be set up to dispense four nickles, the counting device 23B for three dimes, and the counting device 23C for two quarters. The coins will be disposed in the drawer 62 so that as the drawer advances the compartments 72A, 72B, and 72C dump nickels, dimes and quarters, respectively, into the hoppers 40A, 40B, and 40C, in the desired ratio of four to three to two, respectively.

Each circular plate 32 of each counting device is provided with a motor 76 which is suitably mounted to the lower large surface 78 of the baseboard by a diametric bracket 80, bolts 82, and standoff bolts 84. The motor shaft 86 is coupled, via suitable cog wheels 88 and 90 and chain 92, to a shaft 94 which is fixed to the plate 32 and journaled through the bracket 80 at 96. Suitable C rings 98 and 100 may be provided to prevent longitudinal movement of the shaft 94.

Each circular plate 32 is also provided with a pair of stirring bars 102 and 104, whose function is to stir up the pile of coins lying in the lower volume of the hopper as the plate rotates. A stripper plate 106 is disposed within the hopper and spaced from the plate 32 a distance adequate to clear the stirring bars 102 and 104. The stripper plate is fixed between the hopper and the baseboard 24 by the adjacent screws 42. The upper portion of the stripper plate extends above the level of the coins in the lower volume of the hopper. The stripper plate spacing from the circular plate is less than the diameter of the coins, and, therefore, any coins disposed within this spacing will be substantially on edge rather than lying flat. Thus the stirrer bars will be able to dislodge any coins within the spacing, and, further, will impinge on the main mass of coins from substantially underneath the mass, providing an upward movement to the mass. In the abscence of the stripper plate 106, the stirrer bars would impinge on the upper surface of the mass of coins, tending to press the mass further into the bottom of the hopper, which may tend to cause jamming.

As the plate 32 rotates, the pins 58 pull individual coins upwardly in the annular recess 34. The width of the recess 34 may conveniently be only slightly larger than the diameter of the coins being handled, while the depth of the recess may be substantially equal to the thickness of the coins. Thus only a single layer of coins should be presented by the plate to the intermediate chute 38 and cover 48. The coins pass from the plate recess 34, along the intermediate cover bent in lower edge 54, through the intermediate chute 38, and into the counting chute 26. The pins 58 pass through the gap 56 in the intermediate cover.

A rocker arm 110 is pivoted at 112 to the lower large surface 78 of the baseboard. A plurality of holes 114, 116, 118 and 120 are formed through the baseboard 24, approximately one half of the cross-section of each hole lying within the counting chute 26. These holes are spaced vertically apart by the diameter of the coin being handled, or multiple thereof. The holes 114, 116 and 118 are below the pivot 112, while the hole 120 is above the pivot. The rocker arm 110 is drilled and tapped to receive pins which will extend into these holes in the baseboard. As shown in FIGURE 4, a pin 122 is mounted on the rocker arm and extends through hole 120, and a pin 124 is mounted on the rocker arm and extends through the hole 114. Considering also FIGURES 7A and 7B, it will be seen that when the rocker arm is in position of FIGURE 7A, the pin 124 projects through the hole 114 into the counting chute 26; while the pin 122, which projects through the hole 120, is disposed without the chute. Thus when the rocker arm is in the FIGURE 7A position, coins may fall through the chute up to pin 124. When the rocker arm is swung to the FIGURE 7B position, the pin 122 is first disposed within the chute, blocking the coins above its level, while the pin 124 is then disposed without the chute, permitting the fall of the coins between its level and the level of the pin 122. When the rocker arm is swung back to the FIGURE 7A position, the pin 124 again blocks the chute, the pin 122 is removed from the chute and the coins above the level of the pin 122 fall to the level of the pin 124. The rocker arm is operated by a solenoid 125.

A double pole, single throw, snap action switch 126 is fixedly mounted, as by bolts 128, to the baseboard lower surface 78. The actuator arm 130 of the switch extends through an arcuate slot 132 through the baseboard and projects into the counting chute 26. As each coin passes through the counting chute it displaces the switch actuator 130. When the chute, as shown in FIGURE 4, has a full load of coins, the topmost coin will hold the switch actuator 130 in its displaced position.

This stacking of the coins in edge to edge relationship in the counting chute permits a more accurate counting of coins than is possible with a face to face stacking. When a coin is used, it generally wears on its faces, rather than on its periphery. Thus, three well used and worn dimes may be equal in thickness to two new dimes, while their diameters will be unchanged. Further, it has been found that if the depth of the chute is made somewhat larger than the thickness of the coins, bent or twisted coins can be accurately handled without jams.

Turning now to FIGURE 8, it will be seen that the drawer 62 is fixed to the racks 68 which are meshed with the pinions 70 which are carried and rotated by a shaft of a motor 134. A dimple cam 136 actuates a double pole switch having normally open contact sets 138 and 140. Associated with the motor 134 is a stepping switch 142 having a number of fixed contacts 144, a moving contact 146, a stepping magnet 148, and a restore magnet 150. The bill acceptance device or system actuator 152 operates a normally open, double pole, single throw switch having contact sets 154 and 156. Each snap action switch 126 has a normally open contact set 126no and a normally closed 126nc. The normally open contact sets 126noA, 126noB, 126noC of the snap switches 126A, 126B, 126C, respectively, are all in series circuit with the interlock solenoid 18, and also all in series circuit with the switch contact set 156 and the dispense solenoid 125. Each of the normally closed contact sets 126ncA, 126ncB, 126ncC, of the snap action switches is alone in series circuit with the respective motor 76A, 76B, 76C of the respective counting device 23A, 23B, 23C. A normally closed main power switch 158 is provided which is opened by a projection 160 on the drawer 62 when the drawer has dumped all of its coins, i.e., when the drawer is in its extreme left position.

In operation, the drawer 62 is moved to its extreme right position, wherein the bottom plate 64 provides a bottom for all of the compartments of the drawer. A supply of nickels is disposed in the nickel compartment 72A of the first level of compartments 72 of the drawer, dimes in the dime compartment 72B, and quarters in the quarter compartment 72C, in the ratio of four to three to two. A like supply of coins is disposed in the second level of compartments 72′, the third level 72″, and each subsequent level. A supply of nickels, dimes and quarters in the same ratio, is also disposed in the respective hoppers 40A, 40B and 40C. The normally closed main switch 158 connects the B+ line 162 to a source of power (not shown). Initially each of the counting chutes 26 is empty, and each of the snap action switches 126 is unactuated. Each of the normally closed snap action contact sets is closed and the counting device motors 76 are connected between conductors 162 and 164 and are energized. Each motor 76 rotates its respective coin pickup plate 32, through the mass of coins in the respective hopper 40. The respective stirring bars 104 and 106 agitate the mass of coins and the respective coin pickup pins 58 abut coins which have fallen into the respective annular recesses 34, carrying the coins up to the respective intermediate chutes 38. The coins pass through the respective intermediate chutes into the respective counting chutes 26. The respective rocker arms 110 are normally in the FIGURE 7A position, with the respective pins 124 blocking the bottom of the chutes and the respective pins 122 without the chutes. As each coin falls down the respective counting chute 26 it abuts and swings down the actuator arm 130 of the respective snap action switch 126, momentarily opening the respective circuit to the respective motor 76. As the coin falls further, it releases the arm, closing the motor circuit, and the motor and pickup plate continues to rotate. Depending on the hole of the rocker arm into which the pin 124 has been inserted, a given number of coins will fall into the chutes until one coin will engage the actuator arm 130 and will not release it because the coin is held in place by the stack of coins below it. The respective motor 76 will now remain de-energized and the extraction of coins by the respective plate 32 will cease, as the desired number of coins has been stored in the respective counting chute. When all of the counting chutes are full, all of the actuator arms 130 will be held down, all of the motors 76 will be de-energized, and all of the normally open contact sets of the switches 126 will be closed. The interlock solenoid 18 will now be connected between the conductors 162 and 164 and will be energized, withdrawing its plunger 20 from hole 22 of the tray 14 of the bill acceptor means 152. When a money bill is inserted in the acceptor means and is accepted as authentic the acceptor means momentarily closes the normally open switches 154 and 156. The switch 156, in series with the now closed, normally open, contact sets of switch 126, now connects the dispensing solenoid 125 between the conductors 162 and 164. The energized solenoid 125 moves all of the rocker arms 110 to the FIGURE 7B position to release the coins between the respective pins 124 and 122. The switch 154 connects the stepping solenoid 148 between the conductors 162 and 164, which steps the moving contact 146 by one contact 144. When the acceptor means opens the switches 154 and 156, the respective rocker arms 110 return to the FIGURE 7A position, the one coin remaining in each chute falls to the respective pin 124. The respective actuator arms 130 are released, and the respective motors 76 are energized, starting a new extraction and storing cycle. After a given number of dispensations, the moving contact 146 is stepped to the contact 144 to which a conductor 166 is connected. The conductor 166 is also connected to the positive terminal of the drawer advance motor 134. The negative terminal of the motor 134 is connected, via a conductor 168, to the ground return conductor 164. Thus, the motor is energized via the conductor 162, the switch 154, the moving contact 146, the conductor 166, the motor 134, the conductor 168, and the conductor 164. The motor 134 starts to rotate counterclockwise, moving the drawer 62 to the left and also rotating the dimple cam 136. As the drawer 62 moves it leaves the left edge of the bottom plate 64, dumping coins from the first level of compartments 72 into the respective hoppers 40. As the cam 136 rotates it closes the normally open contact sets 138 and 140. The contact set 140 energizes the restore solenoid 150 via the conductor 162, a conductor 170, the contact set 140, a conductor 172, the solenoid 150, and the conductor 164, which restores the moving contact 146 to its initial position. The contact set 138 maintains the motor 134 energized via the conductor 162, a conductor 174, a conductor 176, the motor 134, the conductor 176, the motor 134, the conductor 168, and the conductor 164. The motor rotates for one full cycle of the cam 136, until the dimple of the cam 136 opens the contact sets 138 and 140. The drawer has been moved to the left a distance equal to the depth of the level of compartments 72. The quantity of coins, the depth of the compartments, and the number of dispensations for the moving contact 146 to be stepped to the conductor 166 are so proportioned that the drawer replenishes the supply of coins in the hoppers before the hoppers are exhausted of coins. As seen in FIGURE 3, as the coins are released from the counting chutes they fall into the catch chute 60 and pass into the cup 16 on the outside of the enclosure 10.

It will be appreciated that various modifications of this dispensing system are feasible within the scope of the invention. For example, the pin 122 may be disposed above the coin which holds down the actuator arm 130. Then this coin will also be dispensed with those below it. It is desirable to utilize a pin 122 in the chute system to prevent any overrun coins which may be lying in the intermediate chute 38 from being dispensed at the same time that the counted coins in the counting chute 26 are dispensed.

Further, as seen in FIGURES 9 and 10, a reciprocating rack 910 may be substituted for the rocking arm 110 previously discussed. The rack 910 is mounted for reciprocatory motion in a pair of brackets 912 and 913 which are fixed to the baseboard 24. A pin 922 is fixed to the upper portion of the rack, and a pin 924 is fixed to the lower portion of the rack. Holes 914, 916, 918, 919, and 920 are provided in the baseboard and chute which cooperate with these pins, substantially as the holes 114, 116, 118 and 120 previously described. The rack is biased by a spring 930 into the position where the pin 924 blocks the chute. A cam 928, which is solenoid operated, reciprocates the rack to the position wherein the pin 922 blocks the chute, and the pin 924 is removed from the chute, dispensing the coins between the pins 924 and 922.

Also, as seen in FIGURE 6, an additional bar 612 may be fixed to the plate 32 by means of a shaft 613 to increase the stirring of the mass of coins in the hopper.

Moreover, it will be desirable to insert a timing relay (not shown) in series with each counting device motor 76. Each of these timing relays will start a timing cycle when the respective snap action switch normally closed contact set 126nc is initially closed. The timing cycle of the relay is substantially more than adequate in time for the plate 32 to extract a coin and pass it through the counting chute 26. If a coin passes through the counting chute while the timing relay is running, it momentarily displaces the switch actuator arm 130 which momentarily opens the contact set 126nc. The opening of the contact set 126nc de-energizes and restores the timing relay and de-energizes the motor 76; and the closing of the contact set starts the timing relay on a new timing cycle, and re-energizes the motor 76. If, however, a coin does not pass into the counting chute while the timing relay is running, at the end of the time period for which the relay is preset, the relay restores itself at the end of the period, de-energizing the motor 76. In this manner, the timing relay will prevent the motor 76 from running for an extended period of time in the event of a shortage of coins or an equipment failure.

While there have been described and illustrated specific embodiments of the invention, it will be obvious that various further changes and modifications may be made therein without departing from the field of the invention which should be limited only by the scope of the appended claims.

What is claimed is:

1. An exchange system comprising
   means for receiving an article from a depositor;
   a plurality of coin processing devices, each device for processing coins of one given denomination, each denomination differing from the other denominations;
   each of said devices including
   reservoir means for storing a plurality of coins of one denomination in random interrelationship,
   intermediate means for counting and storing a predetermined number of coins and dispensing a predetermined number of coins, and
   means for transferring coins from said reservoir means to said intermediate means;
   supply means for storing a plurality of coins of each denomination processed by said devices,
   said supply means including a plurality of groups of compartments, one group for each denomination processed by said devices, each group of compartments for storing coins of one denomination;
   actuating means for actuating each of said intermediate means to dispense the respective predetermined number of coins;
   counting means for counting operations of said actuating means and adapted to transfer the contents of one of each of said denominational groups of compartments to the respective denominational reservoir means upon reaching a predetermined count and multiples thereof;
   said article receiving means adapted on receiving an article to actuate said actuating means; and
   interlock means coupled to said article receiving means and each said intermediate means, normally preventing the receiving of an article by said article receiving means, and adapted upon determining each said intermediate means to have stored the respective predetermined number of coins, to release said article receiving means for receiving an article.

2. An exchange system as set forth in claim 1 wherein:
   said supply means is disposed above said reservoir means to cause the contents of each compartment to be transferred to the respective reservoir means by gravity.

3. An exchange system as set forth in claim 1 wherein:
   said supply means is disposed for sliding motion relative to said reservoir means whereby to bring successively one of each of said denominated groups of compartments into alignment with the respective denominated reservoir means for enabling coin dispensing thereinto.

4. A coin dispensing system comprising:
   hopper means for storing a plurality of coins in random interrelationship;
   counting tube and control means for receiving a first predetermined number of coins, for storing the first predetermined number of coins, and for dispensing a second predetermined number of coins from the stored number of coins;
   feed means, coupled to said counting tube and control means, for serially feeding coins from said hopper means to said counting tube and control means, and actuated thereby to bring the coins stored therein to the first predetermined number;
   supply means for storing coins and for transferring coins to said hopper means; and
   second control means, coupled to said counting tube and control means and said supply means, for counting dispensations of said counting tube and control means and for actuating said supply means to transfer coins on reaching a predetermined count and multiples thereof.

5. A coin dispensing system according to claim 4 wherein:
   said supply means includes a plurality of compartments, each of said plurality of compartments for receiving a plurality of coins;
   said second control means, on reaching the predetermined count, being adapted to cause said supply means to transfer the contents of one of said plurality of compartments to said hopper means.

6. A coin dispensing system according to claim 4 further including:
   interlock means, coupled to said counting tube and control means, for normally precluding said counting tube and control means from dispensing coins, for examining said counting tube and control means for the storage of the first predetermined number of coins, and in response to determining the first number to have been stored, for removing said preclusion against dispensing.

7. A coin dispensing system according to claim 4 wherein:
   said counting tube and control means is adapted to store the coins in a column in edge to edge interrelationship.

8. A coin dispensing system according to claim 4 wherein:
   the second predetermined number of coins dispensed is smaller than the first predetermined number of coins stored.

9. A coin dispensing system according to claim 4 wherein:
   the second predetermined number of coins dispensed is equal to the first predetermined number of coins stored.

10. A coin dispensing system according to claim 5 wherein:
    said supply means comprises a drawer having fixed compartments and a bottom which is movable with respect thereto; and
    said second means is adapted to cause said supply means to unbottom one compartment at a time.

11. A coin dispensing system according to claim 4 wherein:
    said supply means includes a plurality of compartments, each compartment adapted to store a plurality of coins;
    said hopper means includes a plurality of hoppers, and additional means coupled to said control means for providing motion between said hopper means and said supply means to cause respective compartments to be disposed in coin transferring relationship with respective hoppers.

12. A coin dispensing system according to claim 4 wherein:
    said supply means includes a plurality of compartments, each such compartment adapted to receive a plurality of coins, and each compartment having a bottom which is adapted to open whereby to release coins from the respective compartment;
    said hopper means includes a plurality of hoppers, each such hopper associated with a denomination of coin;
    said second control means adapted to cause said compartment to have an open bottom to transfer coins from a respective compartment to a respective hopper for replenishing the coins therein, and
    the quantity of compartments of said supply means exceeding the quantity of hoppers.

13. A coin dispensing system as set forth in claim 4 wherein additional control means are included to stop operation of said feed means when the first predetermined number of coins in said counting tube fails to be reached within a predetermined time interval of operation of said feed means.

References Cited by the Examiner
UNITED STATES PATENTS

| | | | |
|---|---|---|---|
| 1,801,796 | 4/31 | Chalmers | 133—5 |
| 1,881,894 | 10/32 | Olsen | 221—11 |
| 2,231,952 | 2/41 | Rowe et al. | 221—94 |
| 2,653,850 | 9/53 | Vollten | 133—4 |
| 2,732,923 | 1/56 | Parker | 221—94 |
| 2,877,776 | 3/59 | Hoke | 133—4 |
| 3,075,480 | 1/63 | Berg | 221—11 |
| 3,130,736 | 4/64 | Vaccaro | 133—5 |

FOREIGN PATENTS

| | | |
|---|---|---|
| 222,402 | 12/61 | Austria. |
| 472,473 | 8/14 | France. |

EVERETT W. KIRBY, *Primary Examiner.*
RAPHAEL M. LUPO, *Examiner.*